United States Patent [19]

Birilli et al.

[11] 4,219,698
[45] Aug. 26, 1980

[54] REMOTELY ACTUATED TELEPHONE ALARM SYSTEM

[75] Inventors: Joseph A. Birilli, Carmichael; Dennis DeBacker; Carl DiStefano, both of Sacramento, all of Calif.

[73] Assignee: Boreas Electronics, Inc., Sacramento, Calif.

[21] Appl. No.: 908,259

[22] Filed: May 22, 1978

[51] Int. Cl.² ............................................. H04M 11/04
[52] U.S. Cl. ..................................... 179/5 P; 179/2 E; 179/90 BB
[58] Field of Search ............ 179/5 R, 5 P, 2 E, 90 BB

[56] References Cited
U.S. PATENT DOCUMENTS

| | | | |
|---|---|---|---|
| 3,128,351 | 4/1964 | Hohmann, Jr. et al. | 179/90 BB |
| 3,560,657 | 2/1971 | Stone et al. | 179/5 P |
| 3,618,060 | 11/1971 | Nina | 179/5 P |
| 3,683,114 | 8/1972 | Egan et al. | 179/5 R |
| 3,710,024 | 1/1973 | Lacey | 179/5 P |
| 3,843,841 | 10/1974 | Rubinstein | 179/2 E |
| 4,007,333 | 2/1977 | Marheine | 179/5 P |

*Primary Examiner*—Thomas A. Robinson
*Attorney, Agent, or Firm*—Mark C. Jacobs

[57] ABSTRACT

An alarm system that couples into a telephone system serviced by Touch Tone® equipment or Touch Tone® equipment intermixed with digital dialing and which when actuated automatically dials a telephone number and delivers a message into the receiver of the telephone whose number has been dialed. The alarm system is made up of two parts, an emergency transmitter unit and a receiver-dialer unit. The emergency transmitter unit includes a small battery powered radio frequency transmitter. The receiver-dialer unit includes a radio frequency receiver, a magnetic tape transport and a coupling device for coupling the unit into a telephone voice pair. The magnetic tape transport contains a magnetic tape on which is recorded a series of audio frequency tones corresponding to the Touch Tone® combinations of the number to be dialed and a message which is to be delivered. When the emergency transmitter unit is activated it sends out an RF signal which is received by the receiver-dialer unit. Receipt of the signal by the receiver-dialer unit activates the magnetic tape transport and causes the unit to be accessed into a telephone voice pair. Two embodiments of the receiver-dialer unit are disclosed. In one embodiment, the magnetic tape transport is designed to operate solely in a playback mode; whereas in a second embodiment the magnetic tape transport is designed to operate in either a playback or record mode.

14 Claims, 3 Drawing Figures

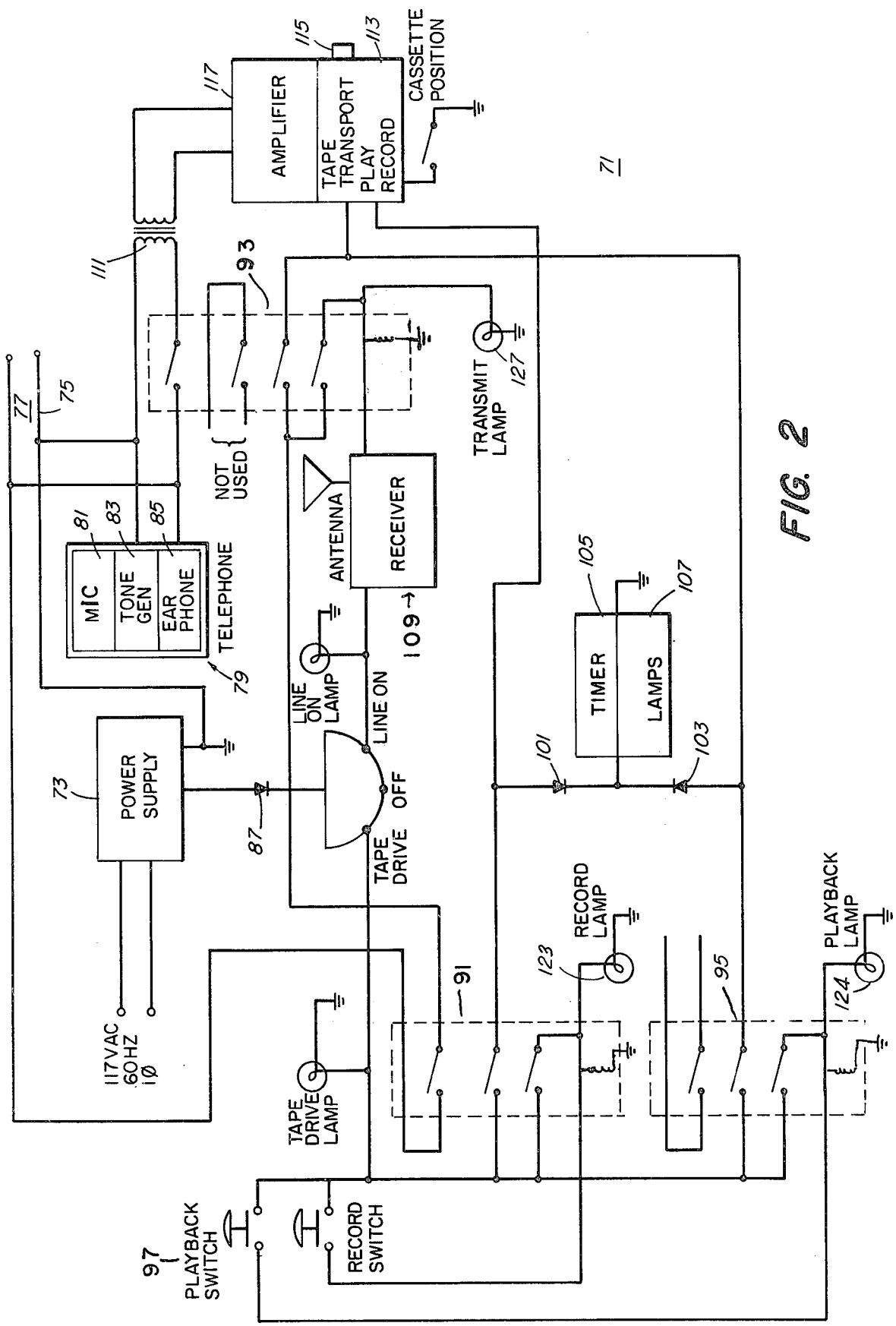

REMOTELY ACTUATED TELEPHONE ALARM SYSTEM

BACKGROUND OF THE INVENTION

This invention relates to an alarm system which employs a radio frequency transmitter and a frequency compatible receiver that couples into a telephone system to ring a remote telephone and deliver a message into the receiver of the remote telephone. More particularly, this invention relates to an alarm system of the type referred to above which is useable on any subscriber telephone line serviced by Touch Tone ® equipment or for telephone exchanges which have Touch Tone ® equipment intermixed with dial type handsets, such exchanges using what is commonly called cross bar dialing.

Common telephone equipment that has been in use for the past forty years has universally used a circular dial type telephone and dialing sequence in which a digital (conducting or nonconducting) sequence of switch openings are used commensurate with the number in the sequence being dialed. Thus, the number three (3) dialed in the sequence results in three interrupts of the natural-state voltage, which is recorded, stored, and used by the central equipment processing the dialing sequence. While providing reasonable access and speed, it can be seen that the logic thus used results in high dialing times for the larger numbers (i.e., 7, 8, 9) and dialing times which are expensive in the aggregate since they result in the seizure of the central processing equipment until such time as the dialing sequence is completed. The dialing function thus produced is also necessarily a high consumer of electrical energy, as well as being slow and cumbersome, since it is necessary to have sufficient energy levels to activate the relay armatures used in the central processing equipment.

More recently, the introduction of the "Touch Tone ® dialing" has provided a telephone communications systems which yields improved dialing speeds, that is, acquisition of the desired subscriber, reduced dialing errors, and better utilization of central processor equipment. The Touch Tone ® dialing system is now well-known in the art, and consists of a series of unique tone-combinations to activate the dialing sequence. These tones are generated by the subscriber's equipment using an audio oscillator and amplifier to generate eight individual tones, which are then used in combinations to represent one of the ten digits (i,e, numbers one through nine plus zero). These tones are all in the audible range from 697 Hz to 1633 Hz (the latter being a spare function). Each tone is selected for its lack of low-beat harmonics. The tones thus generated are used exclusively for the dialing operation and are used in pairs, so as to make twelve unique combinations of tones. Each combination includes a low tone (697, 770, 852, or 941 Hz) and a high tone (1209, 1336, or 1477 Hz) which complete the dialing sequence without the benefit of the digital (logic 0, logic 1 make or break counting) dialing used in previously commonly distributed equipment.

A subscriber, choosing to call another subscriber whether the latter is Touch Tone ® equipped or not, presses the key switches in sequence, generating at each keying action the proper combination of tones uniquely representing each number (0 through 9) in the decimal system. These combinations of tones are sensed by the system central processing equipment to select the proper exchange and subscriber upon that exchange. No switch interrupts are imposed by the subscriber equipment or required by the telephone company's central processing equipment in order to initiate or complete the dialing sequence. Therefore, in lieu of counting dial interrupts in order to identify the called subscriber, the central processing equipment instead, using appropriate detectors of the tones, completes the dialing by its recognition of the tone combinations.

Alarm systems employing a radio frequency transmitter and a frequency compatible receiver that couples into a telephone system to remotely dial a number and deliver a message into the receiver of the telephone of the number dialed are well known in the art. However, in the past such systems have been designed for use with telephone systems employing a digital sequence of switch opening type dialing and not for use with or to take the maximum advantage of systems employing Touch Tone ® dialing.

For example, in U.S. Pat. No. 3,207,850 there is disclosed an alarm system which includes a battery powered radio frequency transmitter and a radio frequency receiver which is coupled to the telephone lines through a phone line activator, a phone station selector and a message player. The phone line activator is either external to or internal to the telephone circuits. The phone station selector is a device that either initiates or simulates a digital switch type of dialing sequence. The message player is made up of a phonograph disc or tape which carries a message and some appropriate form of reproducer or player device to convey the message which is on the disc or tape.

In U.S. Pat. No. 3,843,841 there is disclosed a remotely actuated automatic telephone care system which includes a small device adapted to be worn or carried by a person. The device transmits a radio frequency signal to a base unit that automatically dials one or more predetermined telephone numbers and plays back a recorded message. The base unit, which is designed for use with a digital sequencing type of dialing system includes a two track tape of which the lower tape contains dialing information in the form of a series of 1000 Hz tones.

In U.S. Pat. No. 3,560,657 there is disclosed an automatic warning system which responds to a warning signal energized by an outside agency by closing a switch which permits a power supply to energize the motor on a tape deck. The tape deck generates a plurality of single frequency pulses which are rectified and used to energize an electronic switch that provides data to a coupling mechanism and dials a remote telephone. After the telephone is dialed, the tape deck broadcasts a voice signal and then a further series of single frequency pulses that resets the system and dials a second number or the same number. The switch is then opened and the system turned off.

Other known references which are pertinent in one way or another to this invention are U.S. Pat. No. 2,766,358; U.S. Pat. No. 3,683,114; U.S. Pat. No. 2,022,991; U.S. Pat. No. 2,522,615; and U.S. Pat. No. 2,899,645.

SUMMARY OF THE INVENTION

It is an object of this invention to provide an alarm system that couples into a telephone system for automatically dialing a remote telephone and delivering a message into the receiver of the remote telephone.

It is another object of this invention to provide an alarm system of the type referred to above which is designed for use with and to take the maximum advantage of Touch Tone ® dialing.

It is still another object of this invention to provide a method and system for automatically dialing a telephone number in a telephone system using Touch Tone ® dialing or cross bar dialing.

It is yet still another object of this invention to provide an alarm system for use with a telephone system which does not involve any mechanical movement of a telephone handset or handset switch for dialing a telephone number and transmitting a message through a telephone line.

It is another object of this invention to provide an alarm system for use with a telephone that is relatively easy and economical to construct, is easy to install and is easy to use.

It is still another object of this invention to provide an alarm system for use with a telephone system that will automatically dial a telephone number when activated and repeatedly dial the number if the line is busy.

It is yet still another object of this invention to provide an alarm system of the type referred to above which includes an arrangement for actually recording the message to be delivered into the receiver of the remote telephone.

It is another object of this invention to provide a new and improved technique for recording information corresponding to a telephone number on a recording medium which can then be used to dial the number.

In accordance with the teachings of this inventiion, there is provided an alarm system which consists essentially of two parts or subsystems, namely, an emergency transmitter unit and a receiver dialer unit. The emergency transmitter unit includes a small battery-powered radio transmitter which may be carried by a person or worn by a person and which when activated will generate and transmit a modulated RF signal thereon. The RF energy is of sufficient magnitude to be received by the receiver dialer unit which accesses the telephone lines, completes the dialing sequence and delivers a message into the receiver of the telephone whose number has been dialed. The receiver dialer unit includes a coupling mechanism for coupling the receiver-dialer unit to the telephone system, a high frequency radio receiver for receiving the modulated RF signal from the radio transmitter, and a tape transport device operable in response to the signal being received by the high frequency radio receiver. The tape transport device features a tape containing a series of audio frequency tones corresponding to the Touch Tone ® combinations of the number to be dialed as well as the message to be delivered at the number dialed. The receiver dialer unit further includes a power source for the receiver. Two different embodiments of the receiver dialer unit are described.

In one embodiment the tape transport device is designed to operate in the playback mode only whereas in the other embodiment the tape transport device is designed to operate in either the record or playback mode. When the latter is operating in the record mode a Touch Tone ® telephone may be used to record the telephone number to be called and the message to be delivered are recorded. How this is achieved will be described below.

BRIEF DESCRIPTION OF THE DRAWINGS

In order that the invention may be more fully understood, it will now be described, by way of example, with reference to the accompanying drawings in which like reference numerals or characters represent like parts and wherein:

FIG. 2 is a combination schematic and block diagram of another embodiment of the receiver dialer unit portion of the invention.

DESCRIPTION OF PREFERRED EMBODIMENTS

Figure 1:
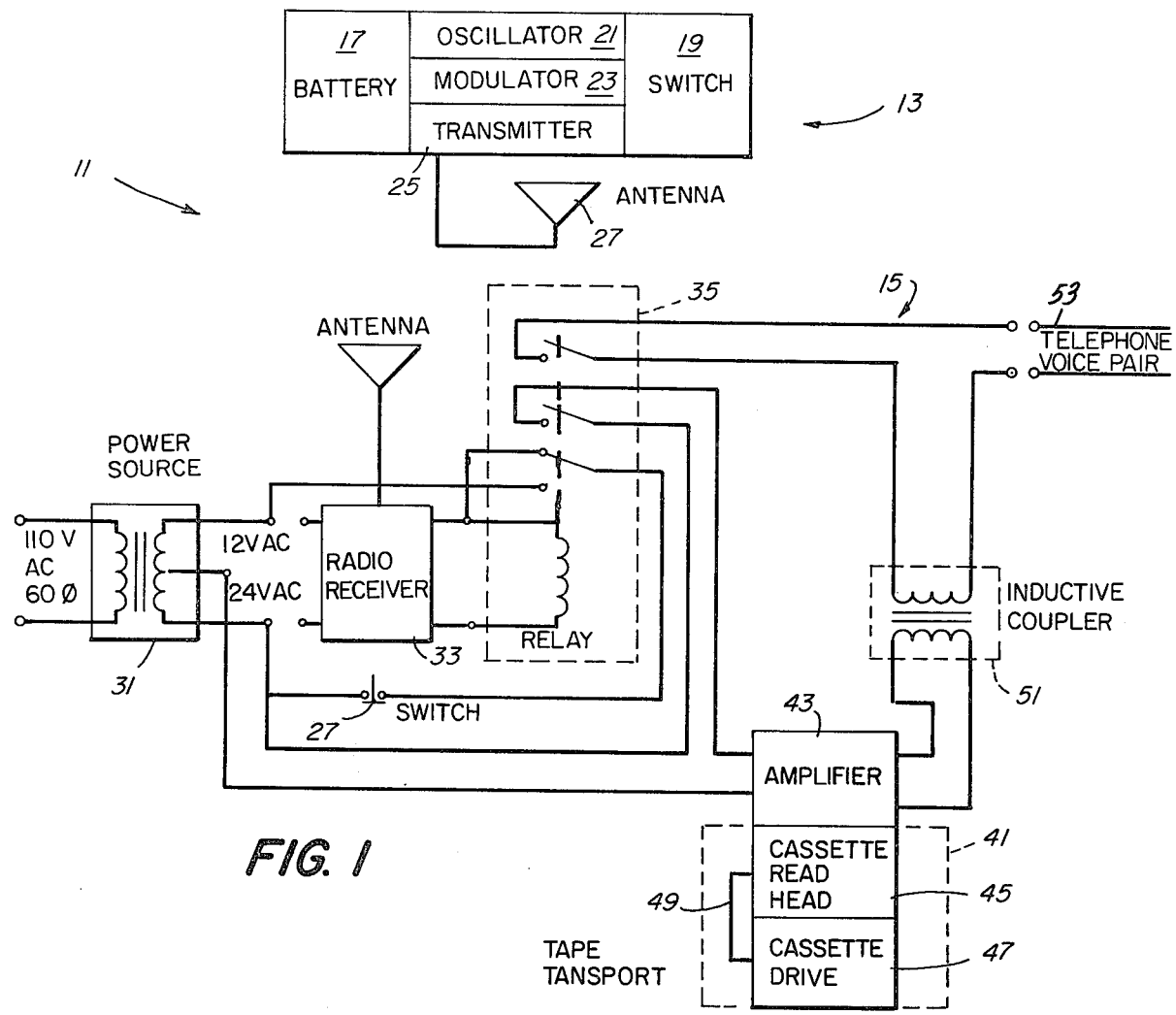
FIG. 1 is a combination schematic and block diagram of the overall system embodying the invention.

Referring now to the drawings there is shown an alarm system constructed according to this invention and identified generally by reference numeral 11.

Alarm system 11 is made up of two separate parts or subassemblies. One of the parts is an emergency transmitter unit which is identified generally by reference numeral 13. The other part is a receiver dialer unit which is identified generally by reference numeral 15.

The emergency transmitter unit 13 includes a battery 17 or other suitable power source, which is placed in the circuit by the activation of switch 19. When placed in the circuit it supplies the power necessary for operating a miniaturized FM radio station. The FM radio station is comprised of an oscillator 21 a modulator 23 and a transmitter 25. In addition the antenna 27 may be either internal or external (as shown). The oscillator 21, the modulator 23, the transmitter 25 and the employed antenna 27 taken together provide for the generation of a preselected RF carrier of a particular frequency, the generation of a preselected audio signal which is carried on the RF carrier and for the transmission of the resulting combined signal through the antenna 27 to a remote receiver. These components are all contained in a small housing (not shown). Activation of the switch 19 initiates the emergency transmitter unit 13 and causes the FM station to radiate a modulated RF signal. The RF signal is of sufficient magnitude to be received by the receiver dialer unit 15.

The receiver dialer unit 15 accesses the telephone lines, completes the dialing sequence and delivers a message to the telephone whose number is being called. The receiver dialer unit 15 includes a power source 31 which may be in the form of a transformer adapted to be connected to a source of 100 Volts AC 60 Hz power (as shown) or may be in the form of a battery pack. The transformer is a center tap auto-transformer which is arranged to deliver both 12 volts AC and 24 volts VAC power. The 24 VAC output is rectified by diodes (not shown) and used to provide power to a radio receiver 33 at all times. When not in operation, receiver 33 represents a two (2) watt load upon the power supply line. Upon receipt of the modulated RF signal from transmitter 25 receiver 33 provides momentary actuation of a relay 35. This relay 35 may be either mechanically latched, in which case two sets of contactors are provided (not shown), or, as shown by an electrically latched relay, in which three sets of contactors are used, the third set of contactors having both a normally open and a normally closed contact. Upon being initially energized by receiver 33, the armature of the relay 35 is enabled directly from the 24 V output of power source 31 through a normally closed contactor on relay 35. Immediately upon actuation, the enable circuit is opened through the normally closed contactor, which is opened when the relay 35 is actuated, and instead enabled through the previously open (non-energized position of the relay) contact. This electrical latching thus completely disables the relay 35 from further operation, insofar as ever returning to its normal energized state is concerned until such time as a reset switch 27 is pressed. At this time the power to the armature of relay 35 is disconnected from the power source 31 and the system becomes capable of being re-activated from receiver 33. Such electrical latching represents an important assurance to the continued operation of the device in the event of power interuption or repeated actuation of the switch 19. The enabling or energizing relay performs two functions. First, a set of contactors on relay 35 provides a circuit for the activation of a tpe transport device 41 and an amplifier 43. Tape transport device 41 includes a cassette read head 45, a cassette drive 47 and a magnetic tape cartidge 49 in which the tape is in the form of an endless spool. Amplifier 43 is coupled to the primary winding of an inductive coupler 51, which is sometimes referred to as a voice coil or voice transformer. Second, relay 35, through a second set of contactors connects the inductive coupler 51 to the voice pair 53 (telephone line). Thus, inductive coupler 51 is only connected with the system is activated. The tape in cartridge 49 may be fitted with a conductive strip to provide for timing or otherwise limiting the activation of the tape transport casette drive 47. The tape contains the following information in recorded forms:

(1) A series of audio frequency tones corresponding to the Touch Tone ® combination of the telephone number that is to be dialed; and
(2) A message to be delivered. The tape may also contain an audio frequency tone which provides for a disconnect, assuming such a tone is in use by the telephone system.

All of the above information is recorded on the tape by a tape recorder or any other conventional means.

Referring now to FIG. 2, there is shown a modified version of the receiver dialer unit which is identified generally by reference numeral 71.

The unit 71 includes a power source 73 having a 24 VAC output and a 12 VAC output. The 12 VAC output is connected to one of the lines 75 in voice pair 77 which is connected to a Touch Tone ® telephone 79. Telephone 79, which is not a part of the unit, includes a microphone 81, a tone generator 83 and an earphone 85. The 24 AC voltage from power source 73 is fed through a diode 87 to the rotor arm of a three contact toggle switch 89, to one of the sets of contacts in a three contact record relay 91 and to one of the sets of contacts in a four contact call relay 93. Two of the sets of contacts in record relay 91 are coupled to two of the three sets of contacts in a play-back relay 95 and both the record relay 91 and the play-back relay 95 are both coupled through diodes 101 and 103 respectively to a timer box 105 and a bank of indicator lamps 107. Toggle switch 89 is connected to playback switch 97 and radio receiver 109. Radio receiver 109 is coupled to call relay 93 which is coupled to an inductive coupler 111, a magnetic tape transport 113 having play and record modes and to playback 95. Tape transport 113 is provided with a magnetic tape cartridge 115 and is connected to amplifier 117 which is connected to inductive coupler 111. The unit also includes a plurality of indicator lamps 119 through 127. Receiver dialer unit 71 differs from receiver dialer unit 15 primarily in that it permits recording the Touch Tone ® telephone number and the message on the tape using the microphone 81, tone generator 83 and earphone 85 of the telephone 79.

When toggle switch 89 is in the "off" position, the entire unit is inoperative; when toggle switch 89 is in the "tape on" position the unit will record and/or play back a message through telephone 79 but will not transmit the message through the voice pair 77. When toggle switch 89 is in the "on line" position, the unit will access the voice pair 77 when activated. When activated, the tape transport 113 will run until the dialed person disconnects the circuit by hanging up the telephone.

It is to be understood that the invention is not limited to recording on magnetic tape but is also applicable to recording on other types of recording media such as circular discs.

Figure 3:
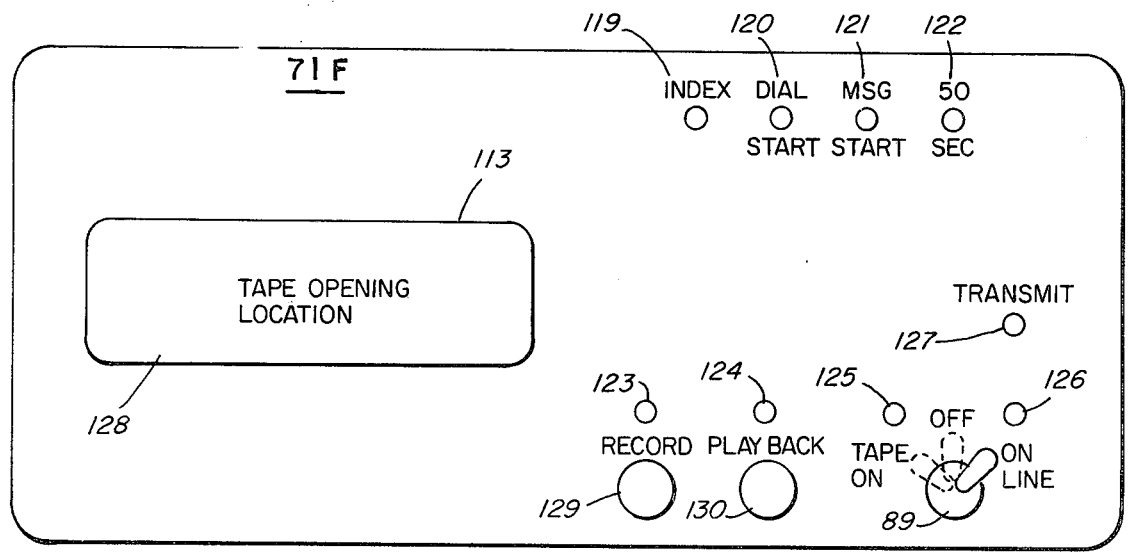
FIG. 3 is a front elevational view of a phsyical rendition of the embodiment of FIG. 2.

In order to better understand the physical appearance and the operation of the device, and especially the embodiment of FIG. 2, reference should now be made to FIG. 3 showing front panel 71F.

In this Figure the device is shown as 71. The tape transport system 113 is seen to be located behind door 128. Any conventional front opening type of cassette system may be employed. These are known to the art and currently found in readily available commercial tape record and playback units made by such manufacturers as Hitachi, Pioneer, Akai, Teac and others. As has been indicated previously, a plurality of lights are shown on the front control panel of system 71. These serve various functions. Light 119, preferably red in color, activates when the tape is at zero or in an index position. This light is usually on for the first zero to nine seconds of an operating interval. Light 120 preferably is also red in color and is activated during the period 10 through 19 seconds of the operating interval. It indicates the time when the dialing system is commencing. Light 121, the message activation light, turns on during the period 20 through 49 seconds and corresponds to the time of delivery of the message. Light 122 also is red and activates from the period of 50 through 59 seconds. It serves to advise the operator of the terminal portion of the message being delivered and/or recorded. The latter is optional and can be tied in to the record function if desired. Light 123 indicates that the unit is in the record function. Record function is commenced by depressing switch button 129. Playback light 124, preferably of a green or some other color than red if said red is used for the previously enumerated lights, is activated when the playback function commences by the pushing of button 130.

Toggle switch 89 is a dual operating switch with a center OFF position. As is seen from the Figure the left operating position constitutes a tape ON position, while the right position is an ON LINE position with center OFF. In the left operating mode the device 71 is not linked to the telephone line, but is linked solely to the telephone instrument. In this mode device 71 can be used to record and playback the desired message by use of the record and playback buttons 129 and 130. Message transmission is not possible when switch 89 is in the left hand mode. When 89 is in the tape On mode, the light 125 which is suggested to be of a green color, indicates that the record and playback functions of device 71 are available for utilization. When switch 89 is moved to the right hand mode, device 71 is linked to the phone line and the phone instrument can be utilized to transmit the message over the phone line when device 71 is activated by the remote transmitter device. In this mode, record and playback functions are not operable. During such times as toggle switch 89 is in the right mode, the timing circuitry which operates lights 119, 120, 121, 122 is non-functional. When the message is being sent over the line by activation of device 71, light 126 will be energized and therefore shine which indicates the fact that device 71 is linked up to the telephone line and the phone instrument as well. When and as a message is being transmitted light 127 will operate to advise the operator that the unit is sending a message for response to the emergency. For discrimination purposes it is suggested that light 127 be amber or some other contrasting color.

When toggle switch is in the center OFF position, the entire unit 71 is non-operational. The on line function is off and the record playback functions are also non-operable.

It is thus seen that for operation of device 71 it is necessary for switch 89 to be placed on the ON line or right hand mode at which time signal light 126 will be energized. When the emergency transmitter is activated, the transmit light on the face plate 71F, namely 127, will be illuminated amber. The tape transport and amplifier will be activated, and the inductive coupler will connect the tape output to the telephone and voice pair 77 such that the message may be transmitted over the telephone lines. The tape player 113 will continue to run until the dialed person disconnects the circuit by hanging up the phone on the other end. At that time amber light 127 will go out and the tape transport 113 will automatically index to the metallic strip on the cassette tape and stop. During the transmit cycle the metallic index strip on the cassette tape will not cause the tape to stop. It is seen therefore that the tape stops only when the person called has hung up the phone. In this manner if the phone line is busy, the message will continue to try to make the connection with the desired number and will only terminate when the party on the other side has caused a disconnect after the completion of message sending to such party. The sensing of the dialed person to disconnect or hang up the line may be achieved by any device known to the art for such purposes. Readily available commercial phone answering machines incorporate such disconnect sensing circuitry and no further discussion is required on that point.

While the term light bulbs has been utilized for indicators 119 through 127, it is to be understood to be within the scope of the art to use any of the non-colored light bulbs with colored lenses, colored light bubls, or other indicators such as LEDs. It is also within the skill of the art to employ levers of a type known to the art instead of push buttons for the actuation of the record and playback circuitry. If desired, door 128 may be omitted from the device allowing direct access to tape mechanism 113. It is to be understood that the layout shown on front panel 71F is not critical and that the lights, switches and tape mechanism can be placed at any location thereupon. In addition, if desired all of these functions or some of them could be placed on a top panel if such is desired as well.

It is important to understand that standard cassette tapes may not be employed in the instant device. Standard cassette tapes, as the term is known in the art, will record from one end to the other or playback from one end to the other, and then terminate. Here a continuously recycling tape is required for use in cassette deck section 113. Such continuous loop cassettes are known to the art and are employed by telephone solicitors and other people such as recorded weather forecasts to continuously repeat the message on the continuous loop tape.

One big advantage of the device of this invention is the fact that it can be made compact and small since it does not require the use of an internal speaker mechanism for verification of the tape message to be broadcast over the voice pair 77. Thus to verify the message content, after placing a continuous loop cassette into tape drive mechanism 113, merely remove the receiver from the phone cradle and place the earpiece to your ear. Device 71 is activated by pushing playback button 130 which causes playback indicator 124 to shine and the tape drive mechanism to commence. After listening to the taped message, the tape drive will stop at the end of the message and index itself to the starting point. One should then place switch 89 into the right hand operating mode thereby causing green playback light 124 and tape ON light 125 to go out and ON LINE indicator 126 to be energized. The unit is then ready to receive the transmit signal from the remote transmitter in case of an emergency situation.

Since certain changes may be made in the above apparatus without departing from the scope of the invention herein involved, it is intended that all matter contained in the above description and shown in the accompanying drawings shall be interpreted as illustrative and not in a limiting sense.

What is claimed is:

1. An alarm system for use with a telephone system serviced by Touch Tone ® equipment or Touch Tone ® equipment intermixed with digital dialing equipment comprising:
    (a) An emergency transmitter unit energizable to generate a modulated RF signal for transmission to a remote location, and
    (b) a receiver dialer unit energizable in response to receipt of the modulated RF signal transmitted by the emergency transmitter and adapted to be coupled into a telephone line for automatically dialing a preselected telephone and delivering a prerecorded message into the telephone so dialed, said receiver dialer unit including means for storing and transmitting over the telephone line the electrical equivalent of a series of Touch Tone ® combinations corresponding to the number to be dialed and the message to be delivered,
wherein the means for storing and transmitting the series of Touch Tone ® combinations corresponding to the number to be dialed and the message to be delivered over the telephone line comprises a tape transport unit, said transport unit including a recording tape, said recording tape having recorded thereon a series of audio frequency tones corresponding to the series of Touch Tone ® combinations of the number to be dialed along with the message to be delivered.

2. The alarm system of claim 1 and wherein the receiver dialer unit further includes a radio frequency receiver for receiving the modulated RF signal transmitted by the emergency transmitter and activating the tape transport unit.

3. The alarm system of claim 2 and further including switch means for coupling the radio frequency receiver to the tape transport unit.

4. The alarm system according to claim 1 and wherein the tape transport unit is a magnetic tape transport.

5. The alarm system according to claim 4 and wherein the recording tape is magnetic tape.

6. The alarm system according to claim 5 and wherein said tape transport unit includes a cassette read head and a cassette drive.

7. The alarm system according to claim 4 and wherein the receiver-dialer unit further includes means for coupling into the telephone system.

8. The alarm system of claim 7 and wherein the portion of the telephone system coupled into the coupling means is a telephone voice pair.

9. The alarm system of claim 8 and wherein the means for coupling into the telephone system comprises an inductive coupler device connected between the telephone voice pair and the tape transport unit.

10. The alarm system according to claim 9 and further including a relay coupled between the high frequency receiver and both the tape transport unit and the inductive coupler device.

11. The alarm system according to claim 1 and wherein the tape transport unit includes a record capability and a playback capability.

12. The alarm system according to claim 10 and wherein the receiver dialer unit includes means adapted to be connected to a telephone instrument so as to use said telephone instrument to record the Touch Tone ® combinations corresponding to the number to be dialed and the message to be delivered on the magnetic tape.

13. A method of remotely dialing a telephone in a telephone system serviced by Touch Tone dialing or Touch Tone dialing intermixed with digital dialing and delivering a recorded message comprising
    (a) providing a tape transport unit adapted to be activated in response to an RF signal and having on a recording medium contained therein a series of audio frequency tones corresponding to Touch Tone combinations of the telephone number to be dialed and a message to be delivered,
    (b) coupling the tape transport unit into the telephone system, and
    (c) transmitting an RF signal to the tape transport unit to activate the tape transport unit.

14. A remotely actuated telephone alarm system for dialing a number of a remote station and transmitting through a telephone line a message comprising:
    (a) a magnetic tape transport unit including a magnetic tape having thereon a series of audio frequency tones corresponding to the Touch Tone combinations of the number to be dialed and the message to be delivered,
    (b) an inductive coupler connected on one side to the magnetic tape transport,
    (c) a radio receiver,
    (d) a power source,
    (e) a radio transmitter for transmitting a signal to the radio receiver, and
    (f) relay means for connecting the other side of the inductive coupler to the telephone line and the magnetic tape transport to the power source in response to a signal received by the receiver from the transmitter.

* * * * *